US008626509B2

(12) United States Patent
Roy et al.

(10) Patent No.: US 8,626,509 B2
(45) Date of Patent: Jan. 7, 2014

(54) DETERMINING ONE OR MORE TOPICS OF A CONVERSATION USING A DOMAIN SPECIFIC MODEL

(75) Inventors: Shourya Roy, New Delhi (IN); Laxminarayan Venkata Subramaniam, Gurgaon (IN)

(73) Assignee: Nuance Communications, Inc., Burlington, MA (US)

( * ) Notice: Subject to any disclaimer, the term of this patent is extended or adjusted under 35 U.S.C. 154(b) by 1475 days.

(21) Appl. No.: 12/055,653

(22) Filed: Mar. 26, 2008

(65) Prior Publication Data

US 2008/0177538 A1    Jul. 24, 2008

Related U.S. Application Data

(63) Continuation of application No. 11/549,173, filed on Oct. 13, 2006.

(51) Int. Cl.
*G10L 15/08* (2006.01)
*G06F 17/30* (2006.01)

(52) U.S. Cl.
USPC ............ 704/255; 704/275; 707/777; 707/778

(58) Field of Classification Search
USPC ................... 704/235, 257, 275, 255; 706/55; 707/771, 777, 778
See application file for complete search history.

(56) References Cited

U.S. PATENT DOCUMENTS

| | | | |
|---|---|---|---|
| 4,908,866 A | 3/1990 | Goldwasser et al. | |
| 5,694,558 A * | 12/1997 | Sparks et al. | 715/854 |
| 5,860,063 A | 1/1999 | Gorin et al. | |
| 6,161,087 A | 12/2000 | Wightman et al. | |
| 6,192,110 B1 * | 2/2001 | Abella et al. | 379/88.01 |
| 6,233,575 B1 | 5/2001 | Agrawal et al. | |
| 6,578,032 B1 | 6/2003 | Chandrasekar et al. | |
| 6,754,626 B2 * | 6/2004 | Epstein | 704/235 |
| 7,096,179 B2 * | 8/2006 | Zhu et al. | 704/9 |
| 7,158,935 B1 * | 1/2007 | Gorin et al. | 704/257 |
| 7,184,539 B2 * | 2/2007 | Colson et al. | 379/265.01 |
| 7,320,031 B2 * | 1/2008 | Konig et al. | 709/224 |
| 7,395,511 B1 * | 7/2008 | Robertson et al. | 715/810 |

(Continued)

OTHER PUBLICATIONS

F. Bechet, G. Riccardi and D. Hakkani-Tur; "Mining Spoken Dialogue Corpora for System Evaluation and Modeling"; *Conference on Empirical Methods in Natural Language Processing (EMNLP)*; Jul. 2004; Barcelona, Spain.

(Continued)

*Primary Examiner* — Martin Lerner
(74) *Attorney, Agent, or Firm* — Wolf Greenfield & Sacks, P.C.

(57) ABSTRACT

Applications of a domain specific model are described. A domain specific model may encode information about a domain. Information available in the domain specific model may be used to identify a topic of a conversation, such as a topic of a call to a call center. Callers' complaints can be categorized into coarse as well as fine topic categories by analyzing an initial part of a call and by examining a distribution of topic specific descriptive and discriminative features within the initial portion of the call. Once a call has been identified as belonging to a topic, a call-center agent may be prompted with information about the topic, such as questions and answers and actions related to the topic. Generic to specific information may be provided to the agent as the call progresses.

20 Claims, 8 Drawing Sheets

(56) References Cited

U.S. PATENT DOCUMENTS

| | | | |
|---|---|---|---|
| 7,460,650 B2* | 12/2008 | Bushey et al. | 379/88.03 |
| 7,487,094 B1* | 2/2009 | Konig et al. | 704/270 |
| 7,526,461 B2* | 4/2009 | Srinivasa et al. | 704/4 |
| 7,603,353 B2 | 10/2009 | Knepper et al. | |
| 7,672,845 B2* | 3/2010 | Beranek et al. | 704/251 |
| 2001/0049688 A1* | 12/2001 | Fratkina et al. | 707/104.1 |
| 2002/0103793 A1* | 8/2002 | Koller et al. | 707/3 |
| 2003/0065502 A1* | 4/2003 | Zhu et al. | 704/4 |
| 2003/0065655 A1 | 4/2003 | Syeda-Mahmood | |
| 2003/0105634 A1* | 6/2003 | Abella et al. | 704/257 |
| 2003/0110023 A1 | 6/2003 | Bangalore et al. | |
| 2003/0130841 A1* | 7/2003 | Bangalore et al. | 704/231 |
| 2005/0044487 A1* | 2/2005 | Bellegarda et al. | 715/511 |
| 2005/0283475 A1* | 12/2005 | Beranek et al. | 707/6 |
| 2006/0023863 A1* | 2/2006 | Joseph et al. | 379/265.02 |
| 2006/0080107 A1* | 4/2006 | Hill et al. | 704/275 |
| 2006/0149553 A1* | 7/2006 | Begeja et al. | 704/275 |
| 2006/0149554 A1* | 7/2006 | Begeja et al. | 704/275 |
| 2007/0100624 A1* | 5/2007 | Weng et al. | 704/257 |
| 2007/0179966 A1* | 8/2007 | Li et al. | 707/102 |
| 2007/0244690 A1 | 10/2007 | Peters | |
| 2008/0256063 A1* | 10/2008 | Nasukawa et al. | 707/5 |
| 2009/0150436 A1* | 6/2009 | Godbole et al. | 707/104.1 |
| 2012/0076283 A1* | 3/2012 | Ajmera et al. | 379/93.17 |

OTHER PUBLICATIONS

S. Douglas, D. Agarwal, T. Alonso, R.M. Bell, M. Gilbert, D.F. Swayne and C. Volinsky; "Mining Customer Care Dialogs for Daily News"; *IEEE Trans. on Speech and Audio Processing*; 2005; 13(5):652-660.

P. Haffner, G. Tur and J.H. Wright; "Optimizing SVMs for Complex Call Classification"; *IEEE International Conference on Acoustics, Speech, and Signal Processing*; Apr. 6-10, 2003; Hong Kong.

X. Jiang and A-H. Tan; "Mining Ontological Knowledge from Domain-Specific Documents"; *IEEE International Conference on Data Mining*; Nov. 26-30, 2005; New Orleans, Louisiana, USA.

K. Kummamuru, R. Lotlikar, S. Roy, K. Singal and R. Krishnapuram;."A hierarchical monothetic document clustering algorithm for summarization and browsing search results"; *International Conference on World Wide Web*; 2004; New York, NY, USA.

H-K J. Kuo and C-H. Lee; "Discriminative Training of Natural Language Call Routers"; *IEEE Trans. on Speech and Audio Processing*; 2003; 11(1):24-35.

A.D. Lawson, D.M. Harris and J.J. Grieco; "Effect of Foreign Accent on Speech. Recognition in the NATO N-4 Corpus"; *Eurospeech*; Sep. 1-4, 2003; Geneva, Switzerland.

G. Mishne, D. Carmel, R. Hoory, A. Roytman and A. Soffer; "Automatic Analysis of Call-center Conversations"; *Conference on Information and Knowledge Management*; Oct. 31-Nov. 5, 2005; Bremen, Germany.

M. Padmanabhan, G. Saon, J. Huang, B. Kingsbury and L. Mangu;. "Automatic Speech Recognition Performance on a Voicemail Transcription Task"; *IEEE Trans. on Speech and Audio Processing*; 2002; 10(7):433-442.

M. Tang, B. Pellom and K. Hacioglu; "Call-type Classification and Unsupervised Training for the Call Center Domain"; *Automatic Speech Recognition and Understanding Workshop*; Nov. 30-Dec. 4, 2003; St Thomas, US Virgin Islands.

J. Wright, A. Gorin and G. Riccardi; "Automatic Acquisition of Salient Grammar Fragments for Call-type Classification"; *Eurospeech*; Sep. 1997; Rhodes, Greece.

T. Kawahara and S. Doshita; "Topic independent language model for key-phrase detection and verification"; *IEEE International Conference on Acoustics, Speech, and Signal Processing*; Proceedings; 1999; ICASSP99 (Cat. No. 99CH36258), pt. 2, p. 685-8, vol. 2.

* cited by examiner

```
SPEAKER 1: windows thanks for calling and you can
learn yes i don't mind it so then i went to
SPEAKER 2: well and ok bring the machine front
end loaded with a standard um and that's um it's
a desktop machine and i did that everything was
working wonderfully um I went ahead connected
into my my network um so i i changed my network
settings to um to my home network so i i can you
know it's showing me for my workroom um and then
it is said it had to reboot in order for changes
to take effect so i rebooted and now it's asking
me for a password which i never i never said
anything up
SPEAKER 1: ok just press the escape key i can
doesn't do anything can you pull up so that i mean
```

Fig. 2

```
thank you for calling this is
problem with our serial number software
Q: may i have your serial number
Q: how may i help you today
A: i'm having trouble with my at&t network
............
............
click on advance log in properties
i want you to right click
create a connection across an existing internet
connection
in d. n. s. use default network
............
............
Q: would you like to have your ticket
A: ticket number is two
thank you for calling and have a great day
thank you for calling bye bye
anything else i can help you with
have a great day you too
```

Fig. 4

DETERMINING ONE OR MORE TOPICS OF A CONVERSATION USING A DOMAIN SPECIFIC MODEL

CROSS-REFERENCE TO RELATED APPLICATIONS

This application is a continuation of U.S. application Ser. No. 11/549,173 filed Oct. 13, 2006, the complete disclosure of which, in its entirety, is herein incorporated by reference.

FIELD OF THE INVENTION

The present invention relates generally to speech processing and, in particular, to the generation of domain models from transcriptions of conversation recordings.

BACKGROUND

Call-center is a general term used in relation to help desks, information lines and customer service centers. Many companies today operate call-centers to handle a diversity of customer issues. Such may include product and services related issues and grievance redress. Call-centers are constantly trying to increase customer satisfaction and call handling efficiency by aiding agents and agent monitoring.

Call-centers may use a dialog-based support, relying on voice conversations and on line chat, and email support where a user communicates with a professional agent via email. A typical call-center agent handles over a hundred calls in a day. These calls are typically recorded. As a result, gigabytes of data are produced every day in the form of speech audio, speech transcripts, email etc. This data is valuable for doing analysis at many levels. For example, the data may be used to obtain statistics about the type of problems and issues associated with different products and services. The data may also be used to evaluate call center agents and train the agents to improve their performance.

Today's call-centers handle a wide variety of domains, such as computer sales and support, mobile phones, apparel, care rental, etc. To analyze the calls in any domain, analysts need to identify the key issues in the domain. Further, there may be variations within a domain based on the service providers. An example of a domain where variations within the domain exist that are based on the service providers is the domain of mobile phones.

In the past an analyst would generate a domain model through manual inspection of the data. Such a domain model can include a listing of the call categories, types of problems solved in each category, listing of the customer issues, typical question-answers, appropriate call opening and closing styles etc. In essence, these domain models provide a structured view of the domain.

Manually building such domain models for various domains may become prohibitively resource intensive. Many of the domain models are also dynamic in nature and therefore change over time. For example, when a new version of a mobile phone is introduced, when a new software product is launched in a country, or when a new computer virus starts an attack, the domain model may need to be refined.

In view of the foregoing, a need exists for an automated approach of creating and maintaining domain models.

SUMMARY

It is an object of the present invention to substantially overcome, or at least ameliorate, one or more disadvantages of existing arrangements.

According to an aspect of the present invention there is provided a method of building a domain specific model from transcriptions. The method starts by applying text clustering to the transcriptions to form text clusters. The text clustering is applied at a plurality of different granularities, and groups topically similar phrases in the transcriptions. The relationship between text clusters resulting from the text clustering at different granularities is then identified to form a taxonomy. The taxonomy is augmented with topic specific information.

Preferably the taxonomy is augmented with one or more of: typical issues raised and solutions to those issues; typical questions and answers; and statistics relating to conversations associated with said transcriptions.

In a further preferred implementation the method starts with the initial step of extracting from the transcriptions n-grams based upon their respective frequency of occurrences.

The identifying step preferably identifies relationships between text clusters resulting from the text clustering at granularities of adjacent levels.

Other aspects of the invention are also disclosed.

BRIEF DESCRIPTION OF THE DRAWINGS

One or more embodiments of the present invention will now be described with reference to the drawings, in which:

FIG. 2 shows a partial transcript of a dialog from the internal IT help desk of a company;

FIG. 4 shows a part of topic specific information that has been generated for the "default properti" node in FIG. 3 from an example case;

DETAILED DESCRIPTION

Figure 1:
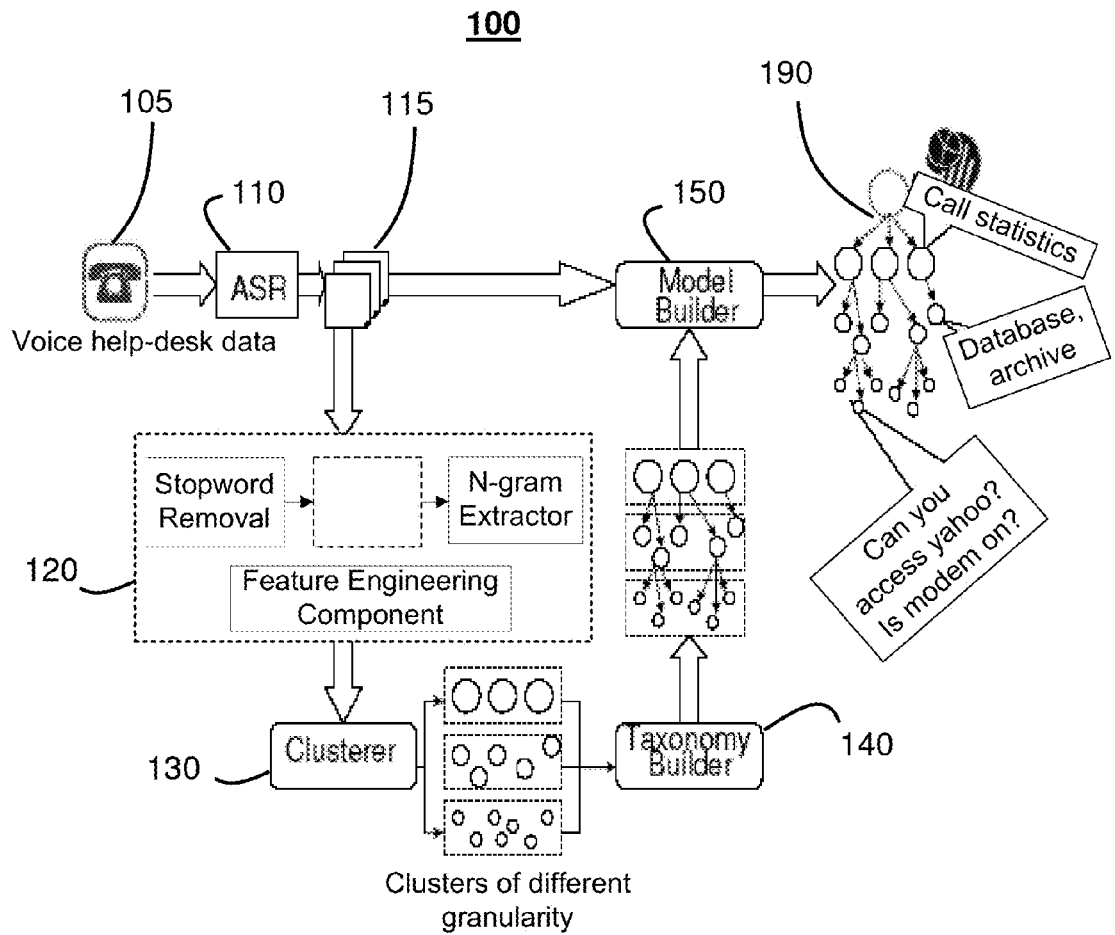
FIG. 1 shows a schematic flow diagram of a method of building a domain specific model from a collection of telephonic conversation recordings.

FIG. 1 shows a schematic flow diagram of a method 100 of building a domain specific model 190 from a collection of conversation recordings 105, such as telephonic conversation recordings. The domain specific model 190 built by the method 100 comprises primarily a topic taxonomy, where every node in the taxonomy is characterized for example by topic(s), typical Question-Answers (QAs), typical actions call statistics etc.

The method 100 is described in the context of a call-center where a customer phones a call-center agent for assistance. However, the method 100 is not so limited. In the embodiment described the conversation recordings 105 comprise dialog between the call-center agent and the customer.

Figure 8:
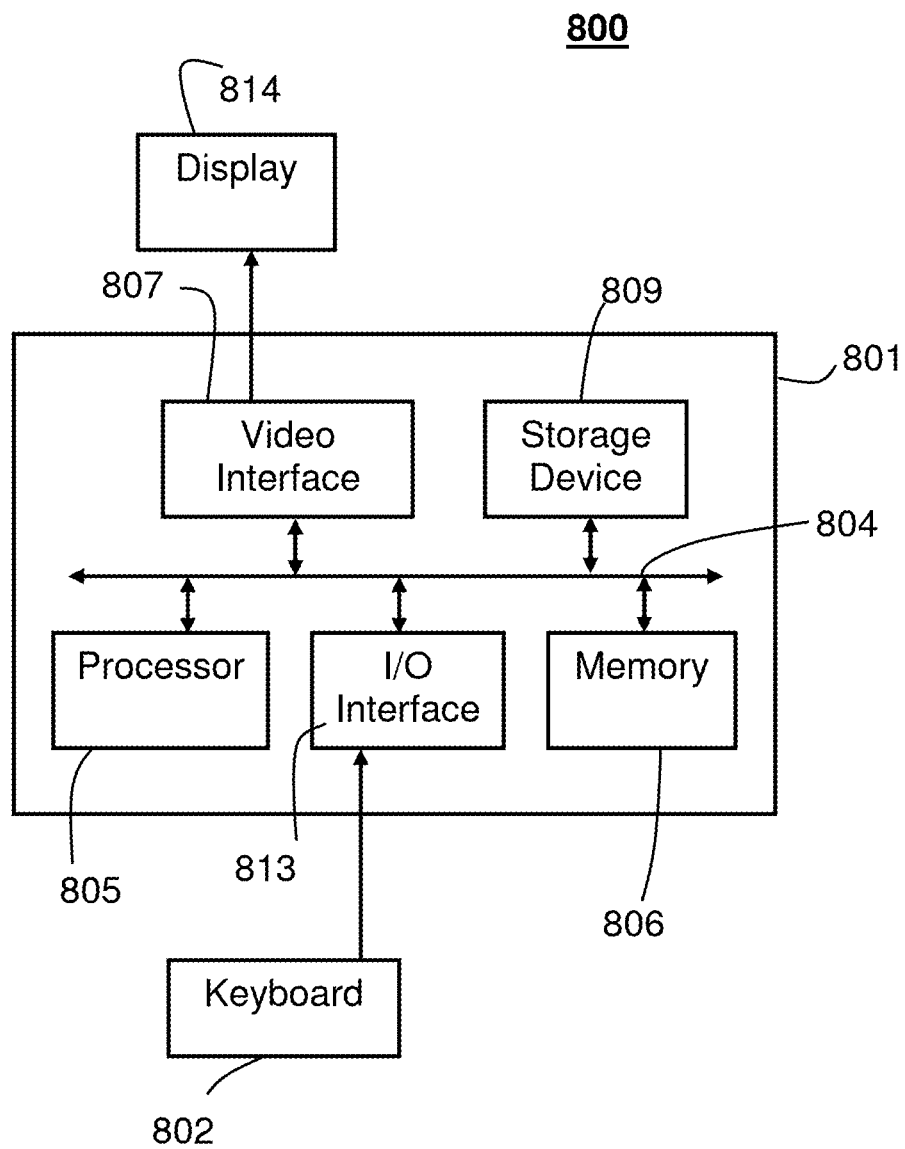
FIG. 8 is a schematic block diagram of a general purpose computer upon which arrangements described can be practiced.

The method 100 of building a domain specific model from a collection of conversation recordings 105 may be practiced using a general-purpose computer system 800, such as that shown in FIG. 8 wherein the processes of FIG. 1 may be implemented as software, such as an application program executing within the computer system 800. In particular, the steps of the method 100 are affected by instructions in the software that are carried out by the computer system 800. The software may be stored in a computer readable medium. The software is loaded into the computer system 800 from the computer readable medium, and then executed by the computer system 800. A computer readable medium having such software or computer program recorded on it is a computer program product. The use of the computer program product in the computer system 800 preferably effects an advantageous apparatus for building a domain specific model 190 from a collection of conversation recordings 105.

The computer system 800 is formed by a computer module 801, input devices such as a keyboard 802, output devices including a display device 814. The computer module 801 typically includes at least one processor unit 805, and a memory unit 806. The module 801 also includes an number of input/output (I/O) interfaces including a video interface 807 that couples to the display device 814, and an I/O interface 813 for the keyboard 802. A storage device 809 is provided and typically includes at least a hard disk drive and a CD-ROM drive. The components 805 to 813 of the computer module 801 typically communicate via an interconnected bus 804 and in a manner which results in a conventional mode of operation of the computer system 800 known to those in the relevant art.

Typically, the application program is resident on the storage device 809 and read and controlled in its execution by the processor 805. In some instances, the application program may be supplied to the user encoded on a CD-ROM or floppy disk and read via a corresponding drive, or alternatively may be read by the user from a network via a modem device. Still further, the software can also be loaded into the computer system 800 from other computer readable media. The term "computer readable medium" as used herein refers to any storage medium that participates in providing instructions and/or data to the computer system 800 for execution and/or processing.

The method 100 may alternatively be implemented in dedicated hardware such as one or more integrated circuits performing the functions or sub functions of method 100.

Referring again to FIG. 1, the method 100 starts in step 110 where the dialog of the conversation recordings 105 is automatically transcribed to form transcription output 115. For example, in the case of telephonic conversation recordings automatic speech recognition (ASR) may be used to automatically transcribe the dialog of the conversation recordings 105.

The transcription output 115 comprises information about the recognized words along with their durations, i.e. start and end times of the words. Further, speaker turns are marked, so the speaker portions are demarcated without exactly naming which part belongs to which speaker.

However, the transcription output 115 contains many errors and a high degree of noise. The method 100 is capable of managing the errors and noise through various feature engineering techniques.

Before describing the feature engineering techniques in more detail the origin of the errors and noise is first discussed. Current ASR technology, when applied to telephone conversations, has moderate to high word error rates. This is particularly true for telephone conversations arising from call-center calls, because call-centers are now located in different parts of the world, resulting in a diversity of accents that the ASR has to contend with. This high error rate implies that many wrong deletions of actual words and wrong insertion of dictionary words are common phenomena. Also, speaker turns are often not correctly identified and portions of both speakers are assigned to a single speaker.

In addition to speech recognition errors, there are other challenges that arise from recognition of spontaneous speech. For example, there are no punctuation marks. Silence periods are marked, but it is not possible to find sentence boundaries based on these silences. There are also repeated words, false starts, many pause filling words such as "um" and "uh", etc.

FIG. 2 shows a partial transcript of a dialog from the internal IT help desk of a company. As can be seen from the partial transcript, due to the high error rate and introduced noise, the transcription output 115 is difficult for humans to interpret.

Referring again to FIG. 1, in order to combat the noise introduced by the ASR, the method 100 continues to step 120 where various feature engineering techniques are employed to perform noise removal. More particularly, a sequence of cleansing operations are performed to remove generic stopwords such as "the", "of", etc., as well as domain specific stopwords such as "serial", "seven", "dot" etc. Pause filling words, such as "um", "uh", and "huh" are also removed.

The words remaining in the transcription output are passed through a stemmer. The stemmer determines a root form of a given inflected (or, sometimes, derived) word form. For example, the root "call" is determined from the word "called". In the preferred implementation Porter's stemmer is used.

The next action performed in step 120 is that all n-grams which occur more frequently than a threshold, and do not contain any stopword, are extracted from the noisy transcriptions.

Next, in step 130, text clustering is applied to the output of step 120 to group topically similar conversations together. In the preferred implementation the clustering high dimensional datasets package (CLUTO package) is used for the text clustering, with the default repeated bisection technique and the cosine function as the similarity metric.

The transcriptions do not contain well formed sentences. Therefore, step 130 applies clustering at different levels of granularity. In the preferred implementation 5 clusters are firstly generated from the transcriptions. Next, 10 clusters from the same set of transcriptions are generated, and so on. At the finest level 100 clusters are generated.

The relationship between groups at different levels of granularity is identified by generating a taxonomy of conversation types in step 140. Step 140 firstly removes clusters containing less than a predetermined number of transcriptions, and secondly, introduces directed edges from cluster $v_1$ to cluster $v_2$ if clusters $v_1$ and $v_2$ share at least one transcription between them, where cluster $v_2$ is one level finer than cluster $v_1$. Clusters $v_1$ and $v_2$ thereby become nodes in adjacent layers in the taxonomy. Each node in the taxonomy may be termed a topic.

A top-down approach is preferred over a bottom-up approach because it indicates the link between clusters of various levels of granularity and also gives the most descriptive and discriminative set of features associated with each node (topic). Descriptive features are the set of features which contribute the most to the average similarity between transcriptions belonging to the same cluster. Similarly, discriminative features are the set of features which contribute the most to the average dissimilarity between transcriptions belonging to different clusters. These features are later used for generating topic specific information.

Figure 3:
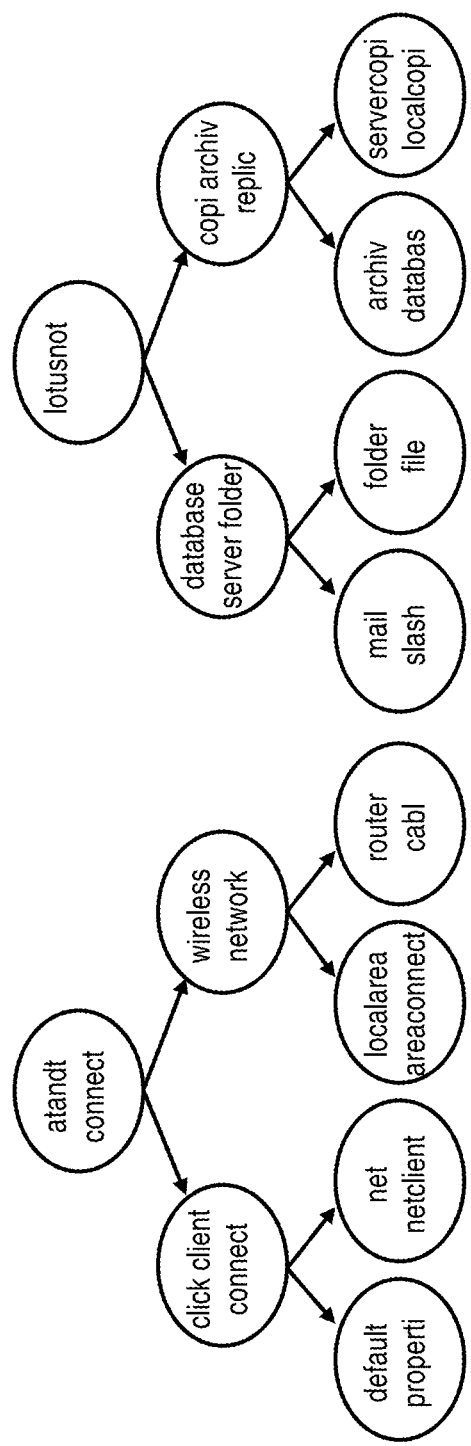
FIG. 3 shows a part of the taxonomy obtained from the dialogs from the internal IT help desk of a company.

FIG. 3 shows a part of the taxonomy obtained from the dialogs from the internal IT help desk of a company. The labels shown in FIG. 3 are the most descriptive and discriminative features of a node given the labels of its ancestors.

Referring again to method 100 shown in FIG. 1, the taxonomy generated in step 140 is augmented in step 150 with various topic specific information related to each node, thereby creating an augmented taxonomy. The topic specific information includes phrases that describe typical actions, typical QAs and call statistics for each topic (node) in the taxonomy.

Typical actions correspond to typical issues raised by the customer, problems and strategies for solving such problems. The inventors have observed that action related phrases are mostly found around topic features. Accordingly, step 150 starts by searching and collecting all the phrases containing topic words from the documents belonging to the topic. In the preferred implementation a 10-word window is defined around the topic features, and all phrases from the documents are harvested. The set of collected phrases are then searched for n-grams with frequency above a preset threshold. For example, both the 10-grams "note in click button to set up for all stops" and "to action settings and click the button to set up" increase the support count of the 5-gram "click button to set up".

The search for the n-grams proceeds based on a threshold on a distance function that counts the insertions necessary to match two phrases. For example, the phrase "can you" is closer to the phrase "can <...> you" than to the phrase "can >...<>...> you". Longer n-grams are allowed a higher distance threshold than shorter n-grams. Next, all the phrases that frequently occur within the cluster are extracted.

Step 150 continues by performing phrase tiling and ordering. Phrase tiling constructs longer n-grams from sequences of overlapping shorter n-grams. The inventors have noted that the phrases have more meaning if they are ordered by their respective appearance. For example, if the phrase "go to the program menu" typically appears before the phrase "select options from program menu", then it is more useful to present the phrases in the order of their appearance. The order is established based on the average turn number in the dialog where a phrase occurs.

Consider next a situation or a case of typical Question-Answers sessions in a call centre. To understand a caller's issue the call center agent needs to ask the appropriate set of questions. Asking the right questions is the key to handle calls effectively. All the questions within a topic are searched for by defining question templates. The question templates look for all phrases beginning with the terms "how", "what", "can I", "can you", "were there" etc. All 10-word phrases conforming to the question templates are collected and phrase harvesting, tiling and ordering is done on those 10-word phrases. For the answers a search is conducted for phrases in the vicinity immediately following the question.

FIG. 4 shows a part of the topic specific information that has been generated for the "default properti" node in FIG. 3 from an example case comprising 200 transcription outputs 115. 123 of the transcription outputs 115 contained the topic "default properti". In the example case, phrases that occur at least 5 times in these 123 transcription outputs 115 were selected. The general opening and closing styles used by the call-center agents in addition to typical actions and QAs for the topic have been captured. The transcription outputs 115 associated with the "default properti" node in FIG. 3 pertain to queries on setting up a new network connection, for example from AT&T. Most of the topic specific issues that have been captured relate to the call-center agent leading the caller through the steps for setting up the network connection.

The following observations can be made from the topic specific information that has been generated:
  Despite the fact that the ASR step 110 introduces a lot of noise, the phrases captured are well formed. The resulting phrases, when collected over the clusters, are clean.
  Some phrases appear in multiple forms. Consider for example the phrases, "thank you for calling how can i help you", "how may i help you today", "thanks for calling can i be of help today". While tiling is able to merge matching phrases, semantically similar phrases are not merged.

With regards to call statistics, various aggregate statistics for each node in the topic taxonomy are captured as part of the domain specific model namely (1) average call duration (in seconds), (2) average transcription length (number of words) (3) average number of speaker turns and (4) number of calls. Generally the call durations and number of speaker turns varies significantly from one topic to another.

Figure 5:
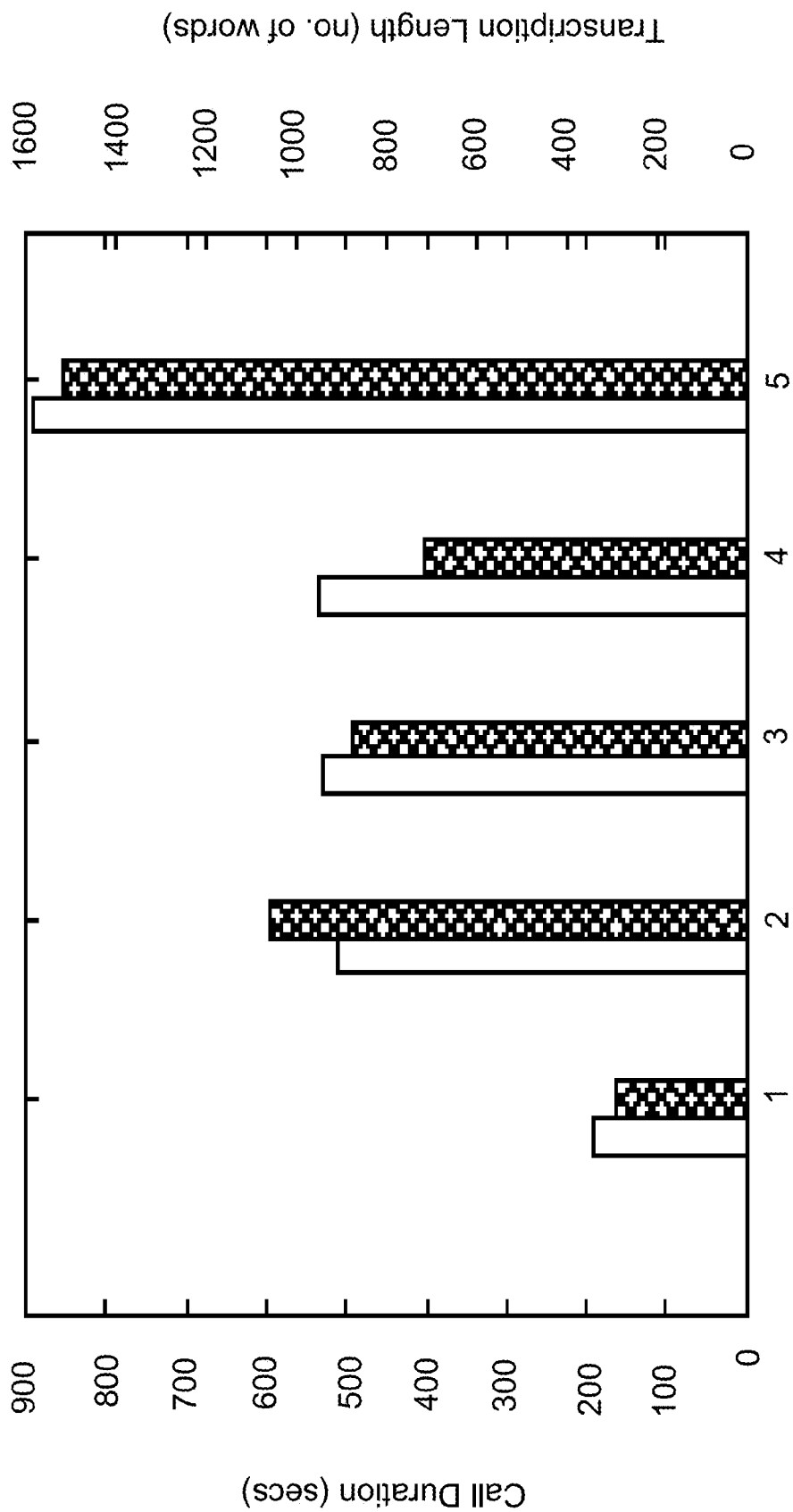
FIG. 5 shows average call duration and corresponding average transcription lengths for topics of interest.

FIG. 5 shows average call duration and corresponding average transcription lengths for a few topics of interest. It can be seen that in topic cluster-1, which relates to expense reimbursement and associated issues, most of the queries were answered relatively quickly when compared to topic cluster-5, for example. Cluster-5 relates to connection related issues. Calls associated with connection related issues require more information from callers and are therefore generally longer in duration. Interestingly, topic cluster-2 and topic cluster-4 have similar average call durations but substantially different average transcription lengths. Cluster-4 is primarily about printer related queries where the customer is often not ready with details, such as printer name and the Internet Protocol (IP) address of the printer, resulting in long hold times. In contrast thereto, cluster-2 which relates to online courses have a shorter transcription length because users generally have details like course name etc. ready and are interactive in nature. It should be apparent to a person skilled in the art that various other clusters may be formed and used, which fall within the scope of the present invention.

A hierarchical index of type {topic→information} based on this automatically generated domain specific model is then built for each topic in the topic taxonomy. An entry of this index contains topic specific information namely (1) typical QAs, (2) typical actions, and (3) call statistics. The information associated with each topic becomes more and more specific the further one goes down this hierarchical index.

The domain specific model may be further refined by semantically clustering topic specific information so that redundant topics are eliminated. Topics in the model may also be linked to technical manuals, catalogs etc. already available on the different topics in the given domain.

Having described the method 100 of building a domain specific model from a collection of telephonic conversation recordings 105, applications of the domain specific model are next described.

Information retrieval from spoken dialog data is an important requirement for call-centers. Call-centers constantly endeavor to improve the call handling efficiency and identify key problem areas. The described domain specific model provides a comprehensive and structured view of the domain that can be used to do both. The domain specific model encodes three levels of information about the domain, namely:
  General: The taxonomy along with the labels gives a general view of the domain. The general information can be used to monitor trends on how the number of calls in different categories changes over time e.g. daily, weekly, monthly.

Topic level: This includes a listing of the specific issues related to the topic, typical customer questions and problems, usual strategies for solving the problems, average call durations, etc. The topic level of information can be used to identify primary issues, problems and solutions pertaining to any category.

Dialog level: This includes information on how agents typically open and close calls, ask questions and guide customers, average number of speaker turns, etc. The dialog level information can be used to monitor whether agents are using courteous language in their calls, whether they ask pertinent questions, etc.

The {topic→information} index requires identification of the topic for each call to make use of information available in the domain specific model. Many of the callers' complaints can be categorized into coarse as well as fine topic categories by analyzing only the initial part of the call. Exploiting this observation fast topic identification is performed using a simple technique based on distribution of topic specific descriptive and discriminative features within the initial portion of the call.

Figure 6:
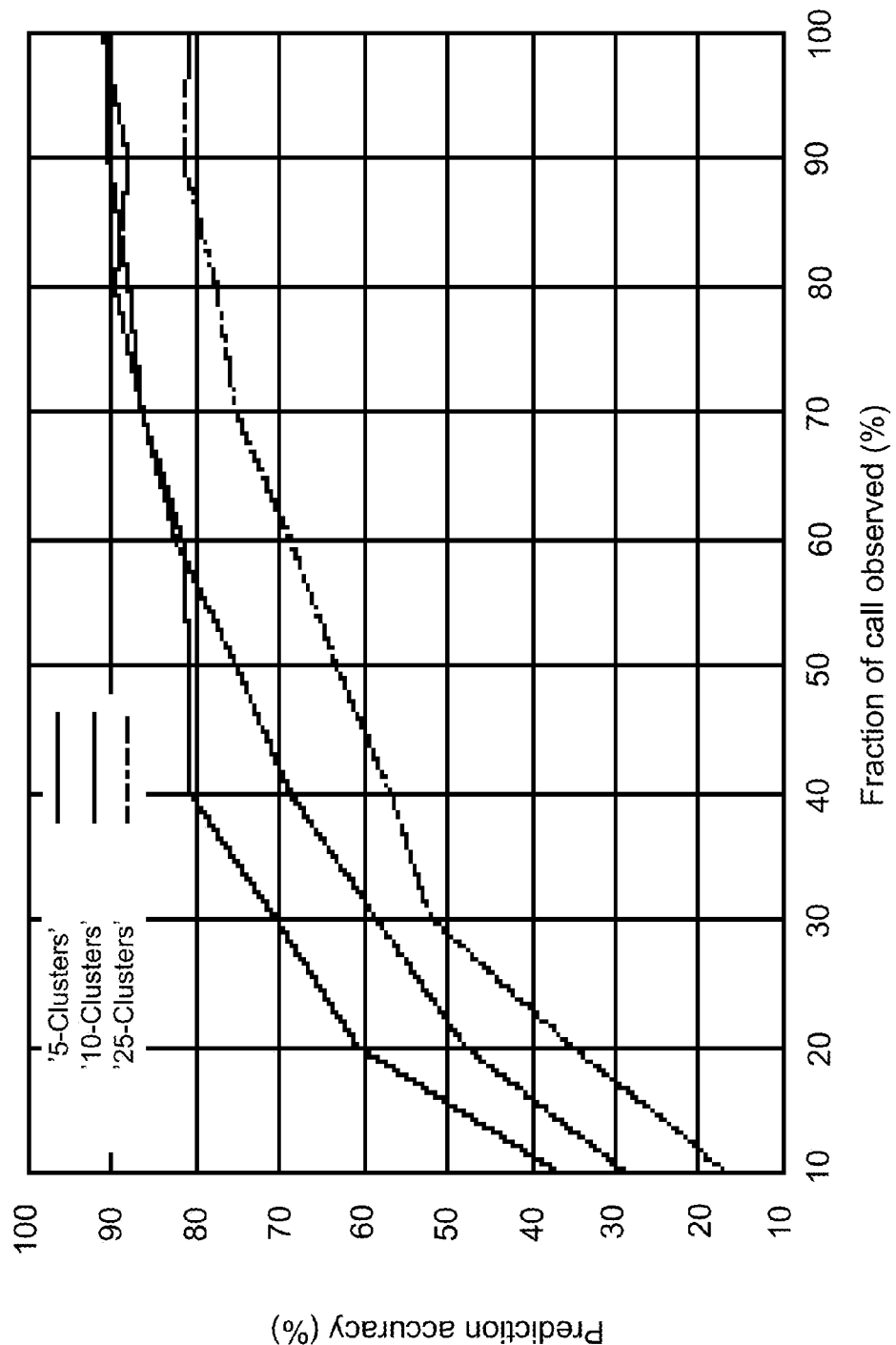
FIG. 6 shows variation in prediction accuracy as a function of the fraction of a call.

FIG. 6 shows variation in prediction accuracy using the method 100 as a function of the fraction of a call observed for 5, 10 and 25 clusters. It can be seen, at coarse level, nearly 70% prediction accuracy can be achieved by analyzing the initial 30% of the call and more than 80% of the calls can be correctly categorized by analyzing only the first half of the call.

Figure 7:
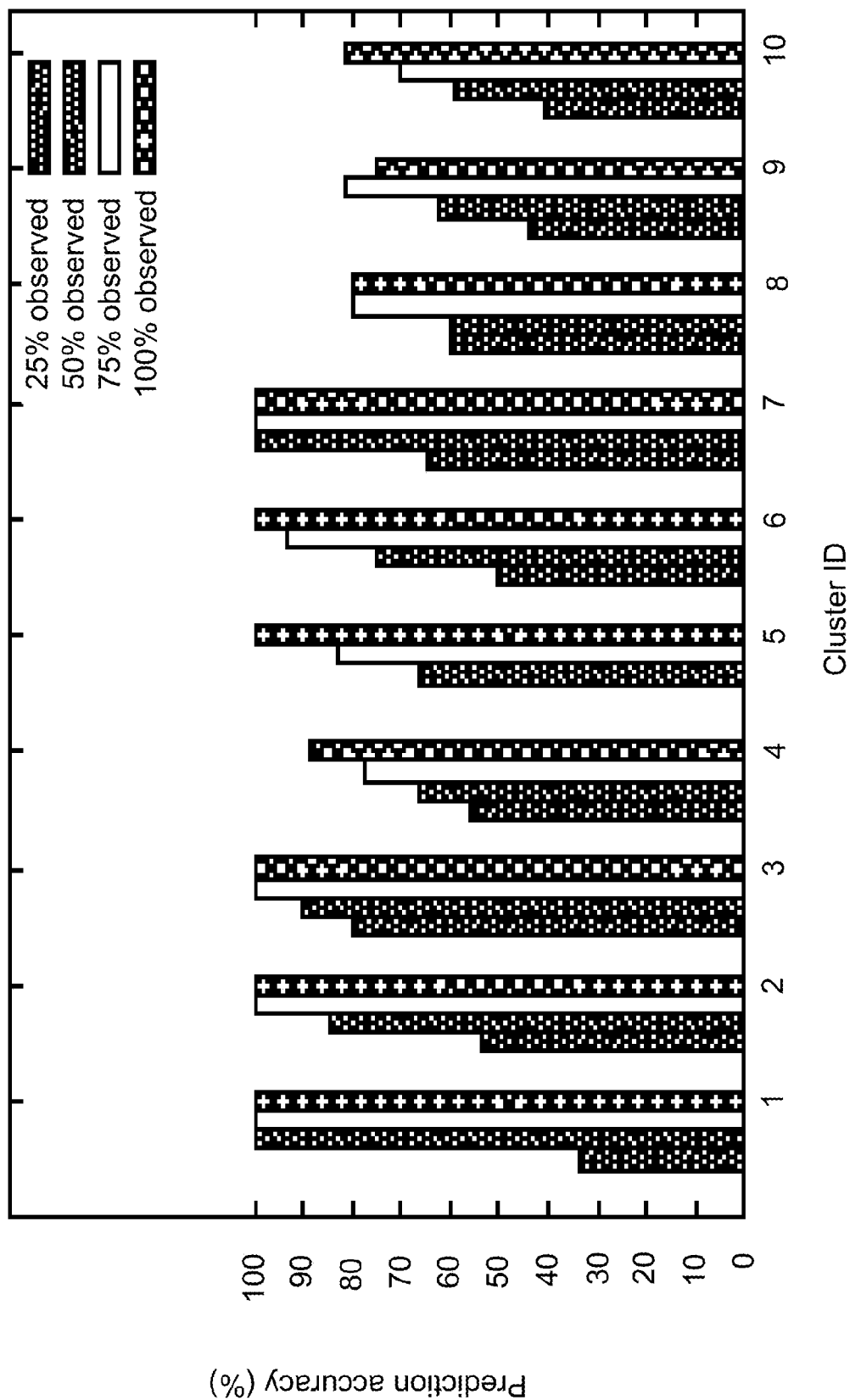
FIG. 7 shows a graph of the prediction accuracy achieved for various clusters after analyzing 25%, 50%, 75% and 100% of the call.

FIG. 7 shows a graph of the prediction accuracy achieved for various clusters after analyzing 25%, 50%, 75% and 100% of the call. It can be seen that calls related to some clusters can be quickly detected compared to some other clusters.

A further application of the domain specific model is in an aiding and administrative tool. One such a tool operates by aiding call-center agents to efficient handle calls, thereby improving customer satisfaction as well as to reduce call handling time. Another is an administrative tool for agent appraisal and training.

Call-centre agent aiding is primarily driven by topic identification. As can be see from FIG. 6, in order to achieve 75% prediction accuracy, a "level-1" topic, which corresponds to the 5-cluster level, can be identified within the first 30% of the calls. Similarly, a "level-2" topic, which corresponds to a 10-cluster level, can be identified within the first 42% of the calls, and a "level-3" topic, which corresponds to a 25-cluster level, can be identified within the first 62% of the calls.

The hierarchical nature of the model assists in providing generic to specific information to the agent as the call progresses. For example, once a call has been identified as belonging to topic {lotusnot} (FIG. 3), the call-center agent is prompted with generic Lotus Notes related QAs and actions. Within the next, say, 45 seconds the tool identifies the topic to be the {copi archive replic} topic, and the typical QAs and actions in the prompts change accordingly. Finally, the tool identifies the topic as the {servercopi localcopi} topic and comes up with suggestions for solving the replication problem in Lotus Notes.

The administrative tool is primarily driven by dialog and topic level information. This post-processing tool is used for comparing completed individual calls with corresponding topics based on the distribution of QAs, actions and call statistics. Based on the topic level information it can be verified whether the agent identified the issues correctly, and offered the known solutions on a given topic. The dialog level information is used to check whether the call-center agent used courteous opening and closing sentences. Calls that deviate from the topic specific distributions are identified in this way and agents handling these calls can be offered further training on the subject matter, courtesy etc. This kind of post-processing tool may also be used to identify abnormally long calls, agents with high average call handle times etc.

The foregoing describes only some embodiments of the present invention, and modifications and/or changes can be made thereto without departing from the scope and spirit of the invention, the embodiments being illustrative and not restrictive.

We claim:

1. A method comprising:

receiving a first set of one or more features of at least a first part of a conversation between at least a first speaker and a second speaker;

comparing, using at least one processor, the first set of one or more features of the at least the first part of the conversation to information regarding a node of a taxonomy of a domain specific model to determine whether the at least the first part of the conversation relates to a topic to which the node of the taxonomy corresponds, wherein the taxonomy of the domain specific model is hierarchical and comprises a plurality of nodes arranged in different levels of a hierarchy, wherein a higher-level node of the taxonomy corresponds to a broad topic and a lower-level node below the higher-level node in the taxonomy corresponds to a specific topic that relates to the broad topic and is more specific than the broad topic, and wherein comparing the first set of one or more features of the at least the first part of the conversation to the information regarding the node comprises comparing the first set of one or more features to information regarding the higher-level node of the taxonomy to determine whether the at least the first part of the conversation relates to the broad topic, wherein the comparing of the first set of one or more features to the information regarding the higher-level node has a first probability of providing a first prediction accuracy in identifying whether the at least the first part of the conversation relates to the broad topic;

in response to determining that a result of the comparing indicates that the at least the first part of the conversation relates to the broad topic, presenting, to a user interface of a device operated by the first speaker, topic-specific information related to the broad topic;

receiving a second set of one or more features of at least a second part of the conversation, the second part of the conversation including both the first part of the conversation and a subsequent part occurring in the conversation following the first part;

in response to determining that the result of the comparing of the first set of the one or more features to the information regarding the higher-level node indicates that the at least the first part of the conversation relates to the broad topic, comparing the second set of one or more features of the first part and the subsequent part to information regarding the lower-level node to determine whether the at least the second part of the conversation relate to the specific topic related to the broad topic, wherein the comparing of the second set of one or more features to the information regarding the lower-level node has a second probability of providing a second prediction accuracy in identifying whether the at least the second part of the conversation relates to the specific topic, the second prediction accuracy being higher than the first prediction accuracy; and in response to determining that a result of the comparing of the second set of one or more features to the information regarding the lower-level node indicates that the at least the second part of the conversation relates to the specific topic, presenting to the first speaker topic-specific information related to the specific topic.

2. The method of claim 1, wherein receiving the one or more features of the at least the part of the conversation between at least the first speaker and the second speaker comprises receiving one or more features of at least a part of a conversation between a call-center agent and a caller regarding an issue, and
wherein presenting to the first speaker topic-specific information comprises, in response to determining that the result of the comparing indicates that the issue relates to the topic to which the node corresponds, presenting the topic-specific information to the call-center agent to aid the call-center agent in resolving the issue.

3. The method of claim 1, wherein presenting the topic-specific information to the first speaker comprises presenting suggestions to the first speaker of information to provide to the second speaker in the conversation and/or information to obtain from the second speaker in the conversation.

4. The method of claim 1, wherein:
comparing the first set of one or more features to the information regarding the higher-level node, presenting the topic-specific information related to the broad topic, comparing the second set of one or more features to the information regarding the lower-level node, and presenting topic-specific information related to the specific topic are carried out during the conversation,
comparing the first set of one or more features to information regarding the higher-level node and presenting the topic-specific information related to the broad topic are carried out after receipt of the first set of one or more features of the at least the first part of the conversation and before receipt of the second set of one or more features of the at least the second part of the conversation, and
comparing the second set of one or more features to the information regarding the lower-level node and presenting the topic-specific information related to the specific topic are carried out after receipt of the first set of one or more features of the at least the first part of the conversation and after receipt of the second set of one or more features of the at least the second part of the conversation.

5. The method of claim 1, wherein the node of the taxonomy is associated with at least one commonly-appearing feature commonly appearing in conversations related to the topic to which the node corresponds, the at least one commonly-appearing feature comprising one or more words and/or phrases, and
wherein comparing the first set of one or more features to the information regarding the node comprises comparing the first set of one or more features of the at least the part of the conversation to the at least one commonly-appearing feature associated with the node.

6. The method of claim 5, wherein:
the node of the taxonomy is further associated with at least one second feature that is more likely to appear in conversations related to the topic to which the node corresponds than to appear in conversations unrelated to the topic to which the node corresponds; and
wherein comparing the one or more features to the information regarding the node comprises comparing the one or more features of the at least the part of the conversation to the at least one commonly-appearing feature and to the at least one second feature associated with the node.

7. The method of claim 1, wherein the receiving, comparing, and presenting are performed on the device operated by the first speaker.

8. The method of claim 1, wherein:
the broad topic to which the higher-level node of the taxonomy corresponds is a first broad topic;
the specific topic to which the lower-level node corresponds is a first specific topic;
the taxonomy of the domain-specific model comprises at least one sibling node to the higher-level node at a same level in the hierarchy as the higher-level node, each of the at least one sibling node corresponding to at least one second broad topic;
the taxonomy of the domain-specific model comprises a plurality of child nodes of the higher-level node, the plurality of child nodes comprising the lower-level node and at least one second child node, each of the at least one second child node corresponding to at least one second specific topic related to the first broad topic to which the higher-level node corresponds;
the method further comprises determining a broad topic to which the at least the first part of the conversation relates, the determining comprising the comparing the first set of the one or more features of the at least the first part of the conversation to information regarding the higher-level node and comparing the first set of the one or more features to information regarding the at least one sibling node; and
the method further comprises determining a specific topic to which the at least the second part of the conversation relate, the determining comprising the comparing, in response to determining that the result of the comparing of the first set of the one or more features to the information regarding the higher-level node indicates that the at least the first part of the conversation relates to the first broad topic, the second set of the one or more features to the information regarding the lower-level node and comparing the second set of the one or more features to information regarding each of the at least one second child node of the higher-level node.

9. The method of claim 1, wherein:
the higher-level node of the taxonomy is associated with information comprising a first distribution of features in conversations related to the broad topic;
the lower-level node of the taxonomy is associated with information comprising a second distribution of features in conversations related to the specific topic;
comparing the first set of one or more features of the at least the first part of the conversation to the information regarding the higher-level node comprises comparing information regarding the first set of one or more features in the at least the first part of the conversation to the first distribution of features in conversations related to the broad topic to determine whether the at least the first part of the conversation relates to the broad topic; and
comparing the second set of one or more features of the at least the second part of the conversation to the information regarding the lower-level node comprises comparing information regarding the second set of one or more features of the at least the second part of the conversation to the second distribution of features in conversations related to the specific topic to determine whether the at least the second part of the conversation relate to the specific topic.

10. An apparatus comprising:

at least one processor; and at least one computer-readable storage medium having encoded thereon processor-executable instructions that, when executed by the at least one processor, cause the at least one processor to carry out a method comprising:

receiving a first set of one or more features of at least a first part of a conversation between at least a first speaker and a second speaker;

comparing, using at least one processor, the first set of one or more features of the at least the first part of the conversation to information regarding a node of a taxonomy of a domain specific model to determine whether the at least the first part of the conversation relates to a topic to which the node of the taxonomy corresponds, wherein the taxonomy of the domain specific model is hierarchical and comprises a plurality of nodes arranged in different levels of a hierarchy, wherein a higher-level node of the taxonomy corresponds to a broad topic and a lower-level node below the higher-level node in the taxonomy corresponds to a specific topic that relates to the broad topic and is more specific than the broad topic, and wherein comparing the first set of one or more features of the at least the first part of the conversation to the information regarding the node comprises comparing the first set of one or more features to information regarding the higher-level node of the taxonomy to determine whether the at least the first part of the conversation relates to the broad topic, wherein the comparing of the first set of one or more features to the information regarding the higher-level node has a first probability of providing a first prediction accuracy in identifying whether the at least the first part of the conversation relates to the broad topic;

in response to determining that a result of the comparing indicates that the at least the first part of the conversation relates to the broad topic, presenting, to a user interface of a device operated by the first speaker, topic-specific information related to the broad topic;

receiving a second set of one or more features of at least a second part of the conversation, the second part of the conversation including both the first part of the conversation and a subsequent part occurring in the conversation following the first part;

in response to determining that the result of the comparing of the first set of the one or more features to the information regarding the higher-level node indicates that the at least the first part of the conversation relates to the broad topic, comparing the second set of one or more features of the first part and the subsequent part to information regarding the lower-level node to determine whether the at least the second part of the conversation relate to the specific topic related to the broad topic, wherein the comparing of the second set of one or more features to the information regarding the lower-level node has a second probability of providing a second prediction accuracy in identifying whether the at least the second part of the conversation relates to the specific topic, the second prediction accuracy being higher than the first prediction accuracy; and in response to determining that a result of the comparing of the second set of one or more features to the information regarding the lower-level node indicates that the at least the second part of the conversation relates to the specific topic, presenting to the first speaker topic-specific information related to the specific topic.

11. The apparatus of claim 10, wherein:

comparing the first set of one or more features to the information regarding the higher-level node, presenting the topic-specific information related to the broad topic, comparing the second set of one or more features to the information regarding the lower-level node, and presenting topic-specific information related to the specific topic are carried out during the conversation, comparing the first set of one or more features to information regarding the higher-level node and presenting the topic-specific information related to the broad topic are carried out after receipt of the first set of one or more features of the at least the first part of the conversation and before receipt of the second set of one or more features of the at least the second part of the conversation, and comparing the second set of one or more features to the information regarding the lower-level node and presenting the topic-specific information related to the specific topic are carried out after receipt of the first set of one or more features of the at least the first part of the conversation and after receipt of the second set of one or more features of the at least the second part of the conversation.

12. The apparatus of claim 10, wherein presenting the topic-specific information to the first speaker comprises presenting suggestions to the first speaker of information to provide to the second speaker in the conversation and/or information to obtain from the second speaker in the conversation.

13. The apparatus of claim 10, wherein the apparatus is the device operated by the first speaker.

14. The apparatus of claim 10, wherein:

the broad topic to which the higher-level node of the taxonomy corresponds is a first broad topic;

the specific topic to which the lower-level node corresponds is a first specific topic;

the taxonomy of the domain-specific model comprises at least one sibling node to the higher-level node at a same level in the hierarchy as the higher-level node, each of the at least one sibling node corresponding to at least one second broad topic;

the taxonomy of the domain-specific model comprises a plurality of child nodes of the higher-level node, the plurality of child nodes comprising the lower-level node and at least one second child node, each of the at least one second child node corresponding to at least one second specific topic related to the first broad topic to which the higher-level node corresponds;

the method further comprises determining a broad topic to which the at least the first part of the conversation relates, the determining comprising the comparing the first set of the one or more features of the at least the first part of the conversation to information regarding the higher-level node and comparing the first set of the one or more features to information regarding the at least one sibling node; and the method further comprises determining a specific topic to which the at least the second part of the conversation relate, the determining comprising the comparing, in response to determining that the result of the comparing of the first set of the one or more features to the information regarding the higher-level node indicates that the at least the first part of the conversation relates to the first broad topic, the second set of the one or more features to the information regarding the lower-level node and comparing the second set of the one or more features to information regarding each of the at least one second child node of the higher-level node.

15. The apparatus of claim 10, wherein:
the higher-level node of the taxonomy is associated with information comprising a first distribution of features in conversations related to the broad topic;
the lower-level node of the taxonomy is associated with information comprising a second distribution of features in conversations related to the specific topic;
comparing the first set of one or more features of the at least the first part of the conversation to the information regarding the higher-level node comprises comparing information regarding the first set of one or more features in the at least the first part of the conversation to the first distribution of features in conversations related to the broad topic to determine whether the at least the first part of the conversation relates to the broad topic; and
comparing the second set of one or more features of the at least the second part of the conversation to the information regarding the lower-level node comprises comparing information regarding the second set of one or more features of the at least the second part of the conversation to the second distribution of features in conversations related to the specific topic to determine whether the at least the second part of the conversation relate to the specific topic.

16. At least one computer-readable storage medium having encoded thereon processor-executable instructions that, when executed by at least one processor, cause the at least one processor to carry out a method comprising:
receiving a first set of one or more features of at least a first part of a conversation between at least a first speaker and a second speaker;
comparing, using at least one processor, the first set of one or more features of the at least the first part of the conversation to information regarding a node of a taxonomy of a domain specific model to determine whether the at least the first part of the conversation relates to a topic to which the node of the taxonomy corresponds, wherein the taxonomy of the domain specific model is hierarchical and comprises a plurality of nodes arranged in different levels of a hierarchy, wherein a higher-level node of the taxonomy corresponds to a broad topic and a lower-level node below the higher-level node in the taxonomy corresponds to a specific topic that relates to the broad topic and is more specific than the broad topic, and wherein comparing the first set of one or more features of the at least the first part of the conversation to the information regarding the node comprises comparing the first set of one or more features to information regarding the higher-level node of the taxonomy to determine whether the at least the first part of the conversation relates to the broad topic, wherein the comparing of the first set of one or more features to the information regarding the higher-level node has a first probability of providing a first prediction accuracy in identifying whether the at least the first part of the conversation relates to the broad topic;
in response to determining that a result of the comparing indicates that the at least the first part of the conversation relates to the broad topic, presenting, to a user interface of a device operated by the first speaker, topic-specific information related to the broad topic;
receiving a second set of one or more features of at least a second part of the conversation, the second part of the conversation including both the first part of the conversation and a subsequent part occurring in the conversation following the first part;
in response to determining that the result of the comparing of the first set of the one or more features to the information regarding the higher-level node indicates that the at least the first part of the conversation relates to the broad topic, comparing the second set of one or more features of the first part and the subsequent part to information regarding the lower-level node to determine whether the at least the second part of the conversation relate to the specific topic related to the broad topic, wherein the comparing of the second set of one or more features to the information regarding the lower-level node has a second probability of providing a second prediction accuracy in identifying whether the at least the second part of the conversation relates to the specific topic, the second prediction accuracy being higher than the first prediction accuracy; and
in response to determining that a result of the comparing of the second set of one or more features to the information regarding the lower-level node indicates that the at least the second part of the conversation relates to the specific topic, presenting to the first speaker topic-specific information related to the specific topic.

17. The at least one computer-readable storage medium of claim 16, wherein:
comparing the first set of one or more features to the information regarding the higher-level node, presenting the topic-specific information related to the broad topic, comparing the second set of one or more features to the information regarding the lower-level node, and presenting topic-specific information related to the specific topic are carried out during the conversation,
comparing the first set of one or more features to information regarding the higher-level node and presenting the topic-specific information related to the broad topic are carried out after receipt of the first set of one or more features of the at least the first part of the conversation and before receipt of the second set of one or more features of the at least the second part of the conversation, and
comparing the second set of one or more features to the information regarding the lower-level node and presenting the topic-specific information related to the specific topic are carried out after receipt of the first set of one or more features of the at least the first part of the conversation and after receipt of the second set of one or more features of the at least the second part of the conversation.

18. The at least one computer-readable storage medium of claim 16, wherein presenting the topic-specific information to the first speaker comprises presenting suggestions to the first speaker of information to provide to the second speaker in the conversation and/or information to obtain from the second speaker in the conversation.

19. The at least one computer-readable storage medium of claim 16, wherein presenting the topic-specific information to the first speaker comprises displaying the topic-specific information to the first speaker.

20. The at least one computer-readable storage medium of claim 16, wherein:
the broad topic to which the higher-level node of the taxonomy corresponds is a first broad topic;

the specific topic to which the lower-level node corresponds is a first specific topic;

the taxonomy of the domain-specific model comprises at least one sibling node to the higher-level node at a same level in the hierarchy as the higher-level node, each of the at least one sibling node corresponding to at least one second broad topic;

the taxonomy of the domain-specific model comprises a plurality of child nodes of the higher-level node, the plurality of child nodes comprising the lower-level node and at least one second child node, each of the at least one second child node corresponding to at least one second specific topic related to the first broad topic to which the higher-level node corresponds;

the method further comprises determining a broad topic to which the at least the first part of the conversation relates, the determining comprising the comparing the first set of the one or more features of the at least the first part of the conversation to information regarding the higher-level node and comparing the first set of the one or more features to information regarding the at least one sibling node; and the method further comprises determining a specific topic to which the at least the second part of the conversation relate, the determining comprising the comparing, in response to determining that the result of the comparing of the first set of the one or more features to the information regarding the higher-level node indicates that the at least the first part of the conversation relates to the first broad topic, the second set of the one or more features to the information regarding the lower-level node and comparing the second set of the one or more features to information regarding each of the at least one second child node of the higher-level node.

* * * * *